United States Patent [19]

Mathur

[11] Patent Number: 5,494,863
[45] Date of Patent: Feb. 27, 1996

[54] PROCESS FOR NUCLEAR WASTE DISPOSAL

[75] Inventor: Akshay Mathur, Tampa, Fla.

[73] Assignee: Vortec Corporation, Collegeville, Pa.

[21] Appl. No.: 354,962

[22] Filed: Dec. 13, 1994

[51] Int. Cl.$^6$ ............................ G21F 9/20; G21F 9/16
[52] U.S. Cl. ............................ 501/12; 252/634; 588/2; 588/10; 588/11; 588/12; 588/20
[58] Field of Search ............................ 501/12; 252/634; 588/2, 10, 11, 12, 20

[56] References Cited

U.S. PATENT DOCUMENTS

| | | | |
|---|---|---|---|
| Re. 32,107 | 4/1986 | January | 501/12 |
| 4,361,505 | 11/1982 | Kikuchi et al. | 252/628 |
| 4,376,070 | 3/1983 | Pope et al. | 501/12 |
| 4,377,507 | 3/1983 | Pope et al. | 252/629 |
| 4,404,105 | 9/1983 | Rysman de Lockerente et al. | 252/634 |
| 4,422,965 | 12/1983 | Chickering et al. | 501/12 |
| 4,759,879 | 7/1988 | Cadoff et al. | 501/12 |
| 4,772,431 | 9/1988 | Aubert | 501/12 |
| 4,943,542 | 7/1990 | Hayashi et al. | 501/12 |
| 5,068,208 | 11/1991 | Haun et al. | 501/12 |
| 5,093,289 | 3/1992 | Braetsch et al. | 501/80 |
| 5,192,351 | 3/1993 | Mathur et al. | 501/12 |
| 5,205,864 | 4/1993 | Snyder | 106/287.26 |
| 5,232,495 | 8/1993 | Shurling, Jr. et al. | 106/487 |
| 5,262,362 | 11/1993 | Covino-Hrbacek | 501/12 |
| 5,294,526 | 3/1994 | Przedziecki et al. | 430/536 |
| 5,294,573 | 3/1994 | Haun | 501/12 |
| 5,304,364 | 4/1994 | Costa et al. | 423/338 |
| 5,308,802 | 5/1994 | Haun | 501/12 |
| 5,316,695 | 5/1994 | Wilkes et al. | 252/315.6 |
| 5,340,777 | 8/1994 | Leung et al. | 501/12 |

FOREIGN PATENT DOCUMENTS 60-143337   5/1985   Japan .

*Primary Examiner*—C. Melissa Bonner
*Attorney, Agent, or Firm*—Nixon, Hargrave, Devans & Doyle

[57] ABSTRACT

The present invention relates to a process for nuclear waste disposal. In it, a glass forming mixture including an aqueous solution of one or more metal alkoxides, alcohol, and solubilized, low level radioactive waste having a pH effective to hydrolyze the one or more metal alkoxides is formed. The one or more metal alkoxides in the glass forming mixture are converted to a network of corresponding one or more metal oxides. A gel is then formed from the glass forming mixture containing the network of one or more metal oxides. The gel is dried and sintered under conditions effective to form a densified glass.

24 Claims, No Drawings

PROCESS FOR NUCLEAR WASTE DISPOSAL

FIELD OF INVENTION

The present invention relates to a process for disposal of nuclear waste in glass prepared by a sol-gel process.

BACKGROUND OF THE INVENTION

Disposal of radioactive defense nuclear waste is one of the biggest environmental problems the United States now faces. Over the last several decades over 230,000 m$^3$ of low level nuclear waste was generated and stored in underground storage tanks located at the Hanford Site in the State of Washington. The low level waste stream consists mostly of sodium nitrate and nitrate salts in alkaline liquid/slurry form.

Reprocessing of either spend nuclear fuel or weapons material results in liquid waste which must be reduced in volume and consolidated to permit safe disposal. The current practice is to dehydrate the liquid waste by heating, then to consolidate the residue by either calcination or vitrification at high temperatures. In the past, defense waste was neutralized in order to precipitate metallic hydroxides. This product can be converted into a vitreous waste form using conventional glass forming technology.

The ultimate suitability of vitreous waste forms is suggested by the durability of rhyolytic obsidian and tektite natural glasses during millions of years in a variety of geologic environments. Unfortunately, these chemically durable, high-silica glasses pose problems as a practical solid-waste form, when made using conventional continuous vitrification processes. Because of the required high fluxing temperatures (~1350° C.), additional off-gas scrubbing capacity or other absorbent procedures are needed to deal with the volatilization losses of radionuclides such as iodine, cesium, and ruthenium. High fluxing temperatures also shorten furnace life and can create problems with the materials into which the molten glass is cast, such as the sensitization of stainless steel to stress corrosion cracking. As a consequence of these limitations, most nuclear waste glass formulations have substantially lower silica content than either natural obsidians, nepheline syenite, or commercial "Pyrex" glasses. Less silica or alumina and more fluxing agent (e.g., $Na_2O$, $K_2O$ or $B_2O_3$) lowers the glass working temperature (to 1000°–1200° C. for most waste glasses) and raises the waste loading capacity. However, this also results in lower chemical durability in most aqueous environments and, particularly for borosilicate compositions, in less resistance to devitrification.

U.S. Pat. No. 4,377,507 to Pope, et al. ("Pope '507"), U.S. Pat. No. 4,376,070 to Pope, et al. ("Pope '070"), and U.S. Pat. No. 4,759,879 to Cadoff, et al. ("Cadoff") disclose immobilizing nuclear waste in glass produced from, amongst other things, a glass-forming silicon compound of the formula $SiR_m(OR')_nX_p$ or $Si(OSiR)_4$ and a glass-forming aluminum compound with the formula $AlR'_a(OR')_rX_s$ or $Mg(Al(OR)_4)_2$ or $Al(OH)_3$ which are each hydrolyzed in alcohol and water, then mixed together. Nuclear waste can then be added as a solid or as an aqueous solution. The mixture is heated to form a gel and dried. The resulting vitreous granules may be sintered at 800°–900° C. (see Pope '507) or melted to form ingots (see Pope '070 and Cadoff). These techniques are not highly satisfactory, because the use of high temperature melting or sintering results in the volatilization of radioactive materials. When melting, high temperature equipment, which is limited in its ability to handle large quantities of nuclear waste, must be utilized. Further, the processes of Pope '507, Pope '070, and Cadoff are not fully able to solubilize nuclear waste materials and, as a result, do not form a homogeneous glass able to maintain nuclear waste materials in an immobilized state.

The present invention is directed to overcoming these deficiencies.

SUMMARY OF THE INVENTION

The present invention relates to a process for nuclear waste disposal. A glass forming mixture including an aqueous solution of one or metal alkoxides, alcohol, and solubilized, low-level radioactive waste having a pH effective to hydrolyze the one or metal alkoxides is formed. The one or more metal alkoxides in the glass forming mixture are converted to a network of corresponding one or more metal oxides. A gel is then formed from the glass forming mixture containing the network of one or more metal oxides. The gel is dried and sintered under conditions effective to form a densified glass. As a result, a homogeneous glass is produced which maintains nuclear waste materials in an immobilized state.

Another aspect of the present invention relating to nuclear waste disposal involves initially reducing the pH level of the low-level radioactive waste stream to a value of less than 1, preferably 0 to 1. At this pH level, the low-level radioactive waste stream is completely solubilized, resulting in the ultimate formation of a homogeneous glass and permitting that glass to be sintered at low temperatures. The low-level radioactive waste having a reduced pH is then incorporated in an aqueous solution of one or more metal alkoxides and alcohol to form a glass forming mixture. Ultimately, a glass is formed from the glass forming mixture using a sol-gel procedure.

Yet another aspect of the present invention relates to a process for nuclear waste disposal starting with a dry porous silicate gel containing low level radioactive waste. The dry porous silicate gel is sintered at temperatures of 600°–700° C. to form a densified glass. The use of this low temperature sintering step decreases operating costs and reduces emissions of radioactive waste.

DESCRIPTION OF THE INVENTION

The present invention relates to a process for nuclear waste disposal. A glass forming mixture including an aqueous solution of one or metal alkoxides, alcohol, and solubilized, low-level radioactive waste having a pH effective to hydrolyze the one or metal alkoxides is formed. The one or more metal alkoxides in the glass forming mixture are converted to a network of corresponding one or more metal oxides. A gel is then formed from the glass forming mixture containing the network of one or more metal oxides. The gel is dried and sintered under conditions effective to form a densified glass.

This process is carried out using a conventional sol gel procedure. This involves forming a sol of silicon alkoxide, water, and, optionally, alkoxides of other metals whose oxide form is desired in the final glass product. This sol mixture is agitated to convert the metal alkoxides to a network of corresponding metal oxides, suitable for gelation. The mixture containing the network of corresponding metal oxides is molded for sufficient time to form a gel.

Silicon alkoxides may be prepared by reacting metal halides and alcohols as follows:

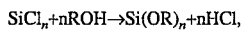

where
R is hydrocarbon group, and
n is 4

Starting materials for silicon alkoxides are tetraethyl orthosilicate and tetramethyl orthosilicate. Aside from alkoxides of silicon, this procedure can be utilized additionally to form alkoxides of aluminum, phosphorus, zirconium, boron, germanium, titanium, and calcium. Alkoxides of these metals may be used in a mixture with silicon alkoxides when it is sought to form a product containing these metals. Alkoxides of alkali and alkaline earth metals, which can similarly be produced and mixed with silicon alkoxides, are formed by the following reaction sequence:

where
M is a metal,
R is a hydrocarbon radical, and
n is generally the valence of M.

Generally, silicon alkoxide is used at a level to produce a final glass product with a silicon dioxide level of 40–100 weight percent, preferably 100 weight percent.

The low-level radioactive waste feed stream added to the glass forming mixture emanates from spent nuclear fuel. It may contain salts of sodium, cesium, molybdenum, strontium, iron, uranium, nickel, magnesium, calcium, zirconium, plutonium, chromium, cobalt, rutherium, copper, cerium, americum, niobium, thorium, curium, and mixtures thereof. The primary constituents of such low level radioactive waste are solutions of sodium nitrate, sodium hydroxide, and sodium aluminate, and the low level nuclear waste, at a pH of approximately 11, is in the form of a solution containing insolubles. It is desirable to solubilize fully the radioactive waste stream prior to adding it to the other ingredients of the glass forming mixture. Such solubilization is achieved by reducing the pH of the low-level radioactive waste to a value of less than 1, preferably 0 to 1, by addition of one or more organic or inorganic acids. Typically, the organic acid can be acetic acid, while the inorganic acid can be HCl or $HNO_3$. At this pH level, the radioactive waste is completely soluble with no insoluble phase.

The low-level waste stream solution is then slowly added to the aqueous solution containing alcohol and alkoxides, making sure that the final glass forming mixture is also a true solution. At this time, other glass formers and/or modifiers, such as boron, calcium and mixtures thereof, can be added in the form of a low pH solution to the glass forming mixture.

Typically, the glass forming mixture of the present invention contains 35 to 85 wt % low level radioactive waste, 0 to 25 wt % metal alkoxide(s), 0 to 10 wt % other glass formers, 0 to 8 wt % water, and 0 to 10 wt % alcohol. These components are mixed to form a sol at room temperature and atmospheric pressure.

As a result of agitation and both water and alcohol condensation, a network of oxide(s) of the metal corresponding to the alkoxide(s) is formed. Possible reactions include the following:

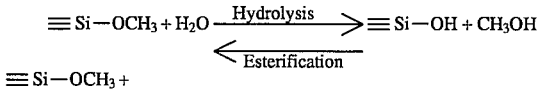

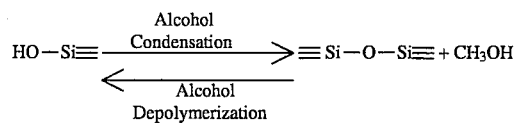

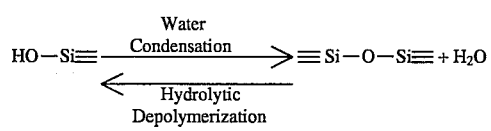

By holding the network-containing sol in a mold for sufficient time, a gel is formed. Rapid hydrolysis and longer gelation times are achieved by addition of an acid catalyst (e.g., hydrogen chloride, nitric acid, or acetic acid) to increase gel pore size; while faster condensation rates and shorter gelation times are accomplished with a base catalyst (e.g., $NH_4OH$). Generally, gel formation is achieved at temperatures of 20°–80° C., preferably 40° C.

It is desirable to age the gel after it is formed at a temperature of 20° to 100° C. for a time period of 1 hour to several weeks. The mix is preferably kept at 95° C. to evaporate as much water as possible. By doing so, salt precipitation (i.e. crystallization) during drying of the gel is avoided, and migration of salts towards the surface of the gel is achieved.

Once a gel is formed, it must be dried. The pore size of silicate gel can be increased by the use of N,N dimethylformamide in combination with small amounts of ammonia. Similar results are achieved with the addition to the glass forming mixture of ethylene glycol when HCl is used as a catalyst.

By drying under hypercritical conditions (i.e., above the critical temperature and pressure of the liquid within the gel), a dried gel known as an aerogel is formed. Under such conditions, a liquid-vapor interface does not exist, and the supercritical fluid within the gel pores can be vented without developing capillary forces that can weaken the aerogel. For alcohol-water mixtures usually found in the gel, supercritical drying is at a temperature of 290°–310° C., preferably 300° C., and at a pressure of 136–184 atmospheres, preferably 163 atmospheres. Under these conditions, 12–18 hours are generally required to dry the gel to a porous aerogel with substantially no interstitial liquid. The aerogel, having a porosity of at least 80% and a density of about 0.2 grams per cubic centimeter, can then be subjected to sintering.

The aerogels produced through hypercritical drying are brittle and weak. It is, therefore, often advantageous to strengthen the aerogels by heating them in air at 1000°–1100° C. This step can be utilized to transform the aerogels to a density of 0.8–1.25 grams per cubic centimeter, preferably 1.0 grams per cubic centimeters per gram, preferably 300 square centimeters per gram.

Xerogels are prepared by drying the gel at a temperature which slowly rises from room temperature to the sintering temperature under atmospheric pressure. Typically, this temperature increase is at a rate of about 50° C. per hour and takes place over 18–20 hours. Following conventional drying, the xerogel has a surface area of 120–160 square centimeters per gram, preferably 150 square centimeters per gram. Generally, xerogels are less porous than aerogels which makes the former more prone to cracking during sintering. To reduce the likelihood of such cracking, N,N-dimethylformamide, a drying control additive, can be included in the sol when xerogels are being produced. In any event, even if cracking takes place, the glass product is still suitable for immobilizing radioactive waste.

Once the gel is dried, it is sintered to transform the dry gel to a fully densified glass with a density of 2.2–2.5 kilograms per meter$^3$ depending on the type of dopant utilized. Sintering of the dry porous silicate gel is carried out at a temperature of 600 to 700° C. to form a densified glass. It is desirable to carry out sintering at a temperature below that of crystallization onset. It is believed possible to sinter at such low temperatures, because the low level radioactive waste is fully solubilized in the glass forming mixture. Sintering can be preceded by a step of heating the dry porous silicate gel by increasing its temperature at a rate of 30° C. per hour up to a temperature of 550° C. prior to sintering.

Sintering involves two phases. Firstly, salts within the gel decompose and react. This reaction is generally completed at temperatures of 550° C. Secondly, at the later stages of sintering, viscous flow takes place. This collapses the pores so they are sealed off from one another.

EXAMPLES

Low level simulant (from double shell slurry tanks) as shown below in Table 1 was prepared by dissolving the salts in 1 liter of water. The pH of the simulant was reduced to less than 1 by the addition of acetic acid and small amounts of concentrated HCl, HNO$_3$, or H$_2$SO$_4$. At this point, the stimulant is a true solution with no solid phase present.

TABLE 1

Low-Level Waste Simulant for Double-Shell Slurry Feed Waste Based on Analysis of Six Tanks Plus Dilutes Normalized to 6.0M Na.

| Component | Target concentration | Compound | Formula Weight | Moles/L required |
|---|---|---|---|---|
| Al$^{+3}$ | 0.61 | Al(NO$_3$)$_3$.9H$_2$O | 375.14 | 0.61 |
| Ca$^{+2}$ | 0.00063 | Ca(NO$_3$)$_2$.4H$_2$O | 236.16 | 0.00063 |
| Cr$^{+3}$ | 0.0052 | Cr(NO$_3$)$_3$.9H$_2$O | 400.17 | 0.0052 |
| Fe$^{+3}$ | 0.00046 | Fe(NO$_3$)$_3$.9H$_2$O | 404.01 | 0.00046 |
| $\chi^+$ | 0.30 | KOH | 56.10 | 0.30 |
| Mg$^{+2}$ | 0.00062 | Mg(NO$_3$)$_2$.6H$_2$O | 256.41 | 0.00062 |
| Mn$^{+2}$ | 0.00025 | Mn(NO$_3$)$_2$ | 178.94 | 0.00025 |
| Mo$^{+6(a)}$ | 0.010 | Na$_2$MoO$_4$.H$_2$O | 241.95 | 0.010 |
| Na$^+$ | 6.0 | — | — | — |
| Sr$^{+2(a)}$ | 0.010 | SrCl$_2$ | 158.52 | 0.010 |
| Cs$^{+(a)}$ | 0.010 | CsNO$_3$ | 194.91 | 0.010 |
| PO$_4^{-3}$ | 0.026 | NaH$_2$PO$_4$.H$_2$O | 138.00 | 0.026 |
| IO$_3^{-(a)}$ | 0.010 | NaIO$_3$ | 197.89 | 0.010 |
| CO$_3^{-2}$ | 0.16 | Na$_2$CO$_3$ | 106.00 | 0.16 |
| Cl$^-$ | 0.096 | NaCl | 58.45 | 0.076 |
| F$^-$ | 0.15 | NaF | 42.00 | 0.15 |
| SO$_4^{-2}$ | 0.026 | Na$_2$SO$_4$ | 142.06 | 0.026 |
| NO$_3^-$ | 1.9 | — | — | — |
| NO$_2^-$ | 1.0 | NaNO$_2$ | 69.00 | 1.0 |
| OH$^{-(b)}$ | 2.3 | NaOH | 40.00 | 4.0 |
| TOC | 0.81 (9.7 g/L) | Na$_4$EDTA, (C$_{10}$) | 416.20 | 0.081 |

$^{(a)}$Cs, Sr, I, and Mo are spiked to 0.01M to provide sufficient amounts of these elements to allow a mass balance to be determined across the melter.
$^{(b)}$To neutralize acidic hydrolyzable metal salts of Al, Ca, Cr, Fe, Mg, Mn, and Sr, an excess of 1.4 moles of NaOH are included.
TOC = Total organic carbon Example 1

The following ingredients were added to the simulant to prepare an oxide composition:

| Ingredients | Grams |
|---|---|
| Tetraethylsilicate (TEOS) | 20.8 |
| Calcium acetate | 1.67 |
| Boric Acid | 2.13 |
| Aluminum di(isopropoxide) acetoacetic chelate | 2.9 |

The simulant with a pH less than 1 was added in an amount to provide a mixture with approximately 15% calcined oxides. The sol was kept in an oven for several hours (4–8 hr.) at 60° C. prior to gelation. The gel was slow dried up to 95° C. over a period of 100 hours. The gel was then heated up to 500° C. at a rate of 15° C./hour. Afterward, the gel was heated up to 700° C. at a rate of 60° C./hour for final sintering. The resulting glass composition was:

| Glass Components | % |
|---|---|
| Calcined oxides from the waste | 15.1 |
| SiO$_2$ | 70.0 |
| CaO | 3.1 |
| Al$_2$O$_3$ | 6.3 |
| B$_2$O$_3$ | 6.4 |

Example 2

The following ingredients were added to the simulant to prepare an oxide composition:

| Ingredients | Grams |
|---|---|
| Tetraethylsilicate (TEOS) | 66.1 |
| Calcium acetate | 5.0 |
| Boric Acid | 5.2 |
| Aluminum di(isopropoxide) acetoacetic chelate | 0.0 |

The simulant with a pH less than 1 was added in an amount to provide the mixture with approximately 25% (7.95 grams) calcined oxides. The sol was kept in an oven for several hours (i.e. 4–8 hours) at 60° C. prior to gelation. The gel was slow dried up to 95° C. over a period of 100 hours. The gel was then heated up to 500° C. at a rate of 15° C. /hour. Afterward the gel was heated up to 650° C. at a rate of 60° C. /hour for final sintering. The resulting glass composition was:

| Glass Components | % |
|---|---|
| Calcined oxides from the waste | 25 |
| SiO$_2$ | 60 |
| CaO | 9.7 |
| B$_2$O$_3$ | 5.3 |

Although the invention has been described in detail for the purpose of illustration it is understood that such detail is solely for that purpose and variations can be made therein by those skilled in the art without departing from the spirit and the scope of the invention which is defined by the following claims.

What is claimed:

1. A process for nuclear waste disposal comprising:
   providing a glass forming mixture comprising an aqueous solution of one or more metal alkoxides, alcohol, and 35 wt % up to 85 wt % of solubilized, low level radioactive waste in a true solution and having a pH effective to hydrolyze the one or more metal alkoxides;

converting the one or more metal alkoxides in the glass forming mixture to a network of corresponding one or more metal oxides;

forming a gel from the glass forming mixture containing the network of one or more metal oxides;

drying the gel; and sintering the dried gel under conditions effective to form a densified glass.

2. A process according to claim 1, wherein the one or more metal alkoxides is selected from the group consisting of alkoxides of silicon, aluminum, phosphorus, zirconium, boron, germanium, titanium, and mixtures thereof.

3. A process according to claim 2, wherein the one or more metal alkoxides is a mixture comprising an aluminum alkoxide and a silicon alkoxide.

4. A process according to claim 1, wherein the glass forming mixture further comprises compounds containing elements selected from the group consisting of boron, calcium, and mixtures thereof.

5. A process according to claim 1, wherein the low level radioactive waste contains salts of sodium, cesium, molybdenum, strontium, and mixtures thereof.

6. A process according to claim 1, wherein said sintering is carried out at a temperature below that of crystallization onset.

7. A process according to claim 6, wherein said sintering comprises:

heating the dried gel to a temperature of 550° C. at a rate of 30° C. /hour and heating at a final sintering temperature of 600° to 700° C.

8. A process according to claim 1, wherein said forming a gel is carried out at a temperature of 20° to 100° C.

9. A process according to claim 8, wherein said forming a gel is catalyzed by an acid or by a base.

10. A process according to claim 9, wherein said forming a gel is catalyzed by a base.

11. A process according to claim 10, wherein the glass forming mixture comprises N,N-dimethylformamide.

12. A process according to claim 9, wherein said forming a gel is catalyzed by an acid.

13. A process according to claim 12, wherein the glass forming mixture comprises ethylene glycol.

14. A process according to claim 1, wherein said drying is carried out under hypercritical conditions at a temperature of 290° to 310° C. and at a pressure of 136 to 184 atmospheres to form an aerogel.

15. A process according to claim 1, wherein a xerogel forms while temperature of said drying is slowly increased to that of said sintering at substantially atmospheric pressure.

16. A process according to claim 1 further comprising:

reducing the pH of the low level radioactive waste to a value of less than 1 before said providing a glass forming mixture.

17. A process according to claim 1 further comprising:

aging the gel after said forming a gel at a temperature of 20° to 100° C. for a time period of 1 hour to several weeks.

18. A process for nuclear waste disposal comprising:

reducing the pH of low level radioactive waste to a value of less than 1 to fully solubilize the waste having a reduced pH is an aqueous solution of one or more metal alkoxides and alcohol to form a glass forming mixture; and forming a glass from the glass forming mixture using a sol-gel procedure.

19. A process according to claim 18, wherein the one or more metal alkoxides is selected from the group consisting of alkoxides of silicon, aluminum, phosphorus, zirconium, boron, germanium, titanium, and mixtures thereof.

20. A process according to claim 19, wherein the one or more metal alkoxides comprises a mixture of an aluminum alkoxide and a silicon alkoxide.

21. A process according to claim 18, wherein the glass forming mixture further comprises compounds containing elements selected from the group consisting of boron, calcium, and mixtures thereof.

22. A process according to claim 18, wherein the low level radioactive waste contains salts of sodium, cesium, molybdenum, strontium, and mixtures thereof.

23. A process according to claim 18, wherein said reducing comprises adding one or more organic or inorganic acids to the low level radioactive waste.

24. A process according to claim 18 further comprising:

adding one or more other glass forming materials to the glass forming mixture after said incorporating.

\* \* \* \* \*